United States Patent [19]

Moore

[11] Patent Number: 4,892,444
[45] Date of Patent: Jan. 9, 1990

[54] RESILIENT UNIT
[75] Inventor: Alan F. Moore, Burbage, England
[73] Assignee: Dunlop Limited a British Company, United Kingdom
[21] Appl. No.: 156,577
[22] Filed: Feb. 17, 1988
[30] Foreign Application Priority Data
  Feb. 24, 1987 [GB] United Kingdom ................ 8704216
  Mar. 7, 1987 [GB] United Kingdom ................ 8705378
[51] Int. Cl.$^4$ ............................................. E02D 21/00
[52] U.S. Cl. .................................. 405/195; 267/125;
    267/141.1; 166/350; 405/224
[58] Field of Search ............... 405/224, 195, 202, 204,
    405/203; 267/125, 141.1; 166/350, 359, 367

[56] References Cited

U.S. PATENT DOCUMENTS

| 1,822,026 | 9/1931 | Guy | 267/141.1 |
| 2,976,930 | 3/1961 | Marquis et al. | 267/125 |
| 4,348,015 | 9/1982 | Domer | 267/153 X |
| 4,501,219 | 2/1985 | Bates | 267/125 X |
| 4,662,791 | 5/1987 | Spicer | 405/212 |
| 4,733,991 | 3/1988 | Myers | 405/224 X |
| 4,759,662 | 7/1988 | Peppel | 405/195 |
| 4,780,026 | 10/1988 | Gunderson | 405/224 |

FOREIGN PATENT DOCUMENTS

| 3533428 | 3/1987 | Fed. Rep. of Germany ... 267/141.1 |
| 535096 | 9/1939 | United Kingdom . |
| 1531352 | 2/1976 | United Kingdom . |

Primary Examiner—Dennis L. Taylor
Attorney, Agent, or Firm—Stevens, Davis, Miller & Mosher

[57] ABSTRACT

A resilient unit able to accomodate a large movement comprises a stack of elastomeric bearing units arranged to be loaded in series and to deform primarily in shear. Preferably a plurality of the stacks are provided in a nested configuration and interconnected in series to enable even greater movements to be accommodated.

The resilient unit is particularly suitable for use on an offshore platform to accommodate movement between the platform and a riser pipe while also maintaining a tension loading in the riser pipe.

18 Claims, 7 Drawing Sheets

RESILIENT UNIT

This invention relates to a resilient unit and in particular, though not exclusively, to a resilient load unit for an offshore tension leg platform and a tension leg platform incorporating an assembly of said resilient load units.

In a tension leg platform tethering lines serve to locate the platform within prescribed limits relative to the seabed and it is necessary to provide tension units to maintain a tension in the plurality of riser pipes provided for fluid transport between the seabed and platform notwithstanding movement of the platform within the prescribed limits. Maintenance of an adequate tension is important to ensure that the riser pipes attached to the platform do not become entangled with consequential risk of damage, and it is necessary also to ensure that the tension does not increase in adverse conditions to a level which also might result in damage.

The present invention seeks to provide a resilient unit able to accommodate a large movement while maintaining a load level within prescribed limits, and to provide a platform installation incorporating at least one such unit for the tension loading of a riser pipe.

In accordance with one aspect of the present invention a resilient unit comprises an inner rigid member, an outer rigid member, and an elastomeric bearing assembly interposed between said rigid members whereby said rigid members are able to move axially relative to one another in a restrained manner, said elastomeric bearing assembly comprising a plurality of elastomeric bearing units arranged to be loaded in series and to deform in shear thereby to provide said restrained relative axial movement of the rigid members in response to applied axial load.

The elastomeric bearing assembly of the resilient unit preferably comprises an axially extending arrangement of a series of annular elastomeric elements which each alternate with and are bonded to respective support rings of a series of rigid support rings, typically a series of outer rings alternating with inner rings as considered in said axial direction and bonded respectively to outer and inner portions of said elements. The resulting bearing assembly is of a generally cylindrical shape with the bonded interfaces all being generally cylindrical in shape whereby axial load applied to the resilient unit results in the respective elastomeric elements being loaded primarily in shear in series with one another.

The resilient unit may comprise between the inner and outer rigid members a plurality of said elastomeric bearing assemblies arranged in a nested configuration in which each of said assemblies surrounds or is surrounded by another of said assemblies and in which a pair of ends, typically opposite ends, of successive bearing assemblies are interconnected whereby load is transmitted from one assembly to the other to load each assembly in series as one of the inner and outer rigid members is moved relative to the other.

In accordance with another aspect of the present invention a resilient loading mechanism comprises the resilient unit of the present invention and associated with said resilient unit mechanical advantage means arranged to act between one of the inner and outer rigid members of the resilient unit and a connecting means whereby relative axial movement of the rigid members causes a greater associated movement of said connecting means.

Preferably the mechanical advantage means is a pulley system comprising at least one pulley wheel rotatably secured relative to one of the inner and outer rigid members of the resilient unit.

The connecting means may be comprised by an end region of a cable or like line member of a pulley mechanism.

In accordance with a further of its aspects the present invention provides a resilient loading mechanism comprising the resilient unit of the present invention and associated with said resilient unit an elastomeric pivot bearing comprising a layer of elastomeric material of part-spherical or substantially part-spherical shape located between complementary shaped rigid bearing surfaces. Preferably the elastomeric material is bonded to said bearing surfaces.

The elastomeric pivot bearing may be of an annular form so as to permit fluid flow therethrough.

The pivot bearing may be secured relative to or integral with one of the inner and outer rigid members, preferably the inner rigid member, of the resilient unit and be positioned generally co-axially with the resilient unit.

Alternatively the elastomeric pivot bearing, secured to one of the rigid members of the resilient unit, may be positioned off-set relative to the longitudinal axis of the resilient unit. In this case preferably a plurality and more preferably at least three resilient units are provided, a rigid member of the pivot bearing being secured to or integral with a rigid member of each of said units. Preferably three or more resilient units are uniformly disposed about a central axis which is coincident with a longitudinal axis of the elastomeric pivot bearing.

In accordance with yet another aspect of the present invention there is provided an offshore structure such as a floating tension leg platform wherein an attachment such as a flexible riser pipe extending and attached to the structure is maintained under tension by means of a resilient loading mechanism and/or resilient unit of the present invention.

A plurality of resilient loading mechanisms are associated with a single riser pipe or like attachment and more preferably said mechanisms are in the form of resilient tension units which apply a tensile load to said line.

In the case where a resilient loading mechanism incorporates mechanical advantage means in the form of a pulley system, preferably connecting means comprised by an end region of the cable or like line member is secured at one end to the riser pipe or like attachment of the offshore structure.

The pulley line member may be directed to the attachment by a pulley unit which in addition to guiding the line member serves, in conjunction with one or more corresponding pulley units of resilient loading mechanisms, to assist in providing transverse location of the riser pipe or like attachment as it moves axially relative to an offshore structure under the influence of the resilient units or other external forces.

The pulley mechanism may include means to vary the free length of the pulley line member between the connecting means and an end of the pulley line member secured relative to one of the rigid members of the associated resilient unit.

Embodiments of the present invention will now be described, by way of example only, with reference to the accompanying diagrammatic drawings wherein.

An offshore tension leg platform 10 comprising a support structure deck 11 is anchored relative to the seabed by means of conventional tethering lines (not shown) secured to peripheral regions of the support structure deck. A cluster of laterally spaced riser pipes 14 extend from the seabed and are attached to a central region of the platform for the flow of gas and/or oil therebetween.

Figure 2:
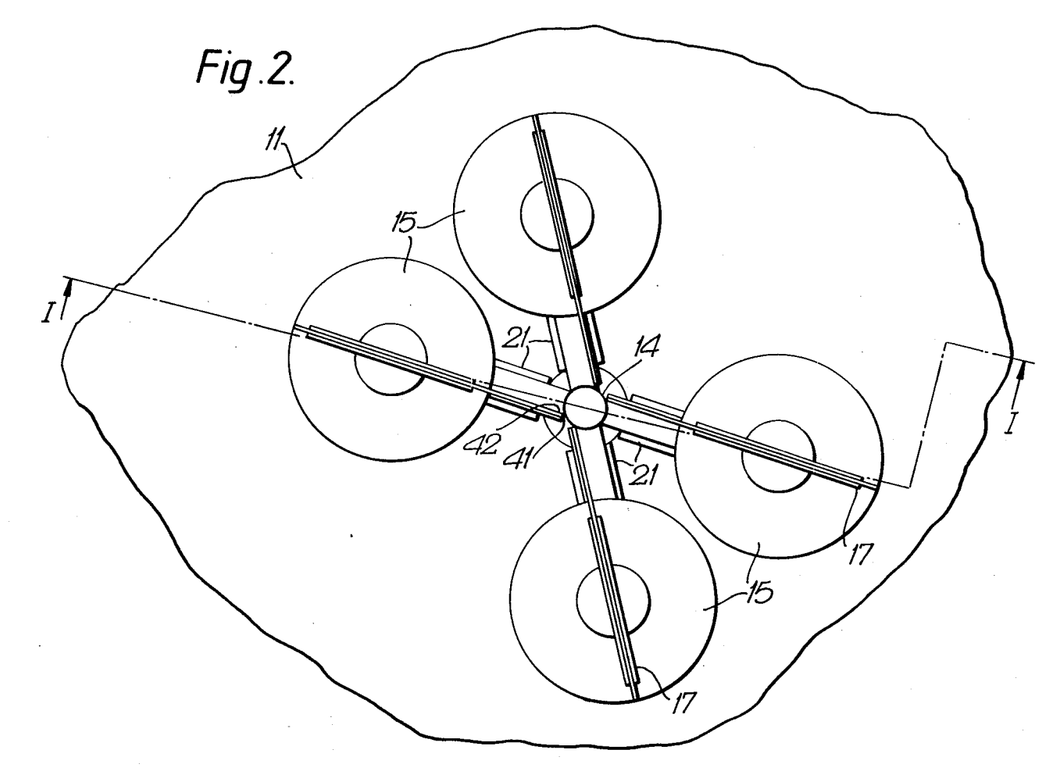
FIG. 2 is a plan view of part of the offshore floating platform shown in FIG. 1.

Each riser pipe 14 is maintained under tension between the seabed and the support deck of the platform by means of four resilient tension load units 15. The four tension units are substantially uniformly spaced around the riser pipe as shown in FIG. 2 and will now be described in more detail.

Each resilient tension unit comprises in essence an inner rigid member able to move axially in a restrained manner relative to an outer rigid member by means of an interposed elastomeric bearing assembly. The inner rigid member is in the form of a metal support tube 16 the upper end of which rotatably supports a pulley 17, referred to hereinafter as an intermediate pulley. The outer rigid member is in the form of a cylindrical housing 18 having cylindrical upper and lower end caps 19,20; the support tube 16 extends through central openings in each of the end caps which thereby act as guides and radially locate the support tube relative to the housing.

The opening in the lower end cap 20 incorporates a fluid seal (not shown) which bears against the support tube to restrain leakage of fluid from within the housing even during relative axial movement of the housing and support tube. It is not intended that the housing should contain pressurized fluid but a fluid or dust seal may be incorporated in the opening of the upper end cap 19 to deter ingress of foreign matter.

Two pulleys 21,22 are associated with each tension unit and are mounted for rotation about respective axes fixed relative to the support structure deck 11, the pulleys in this embodiment being mounted at the upper end of the housing at diametrically opposite positions thereof. The axes of rotation of said two pulleys are parallel with one another and with the axis of rotation of the intermediate pulley 17. One of said two pulleys, an inner pulley, is a double-grooved guide pulley 21 which as described below assists in radially locating and guiding a riser pipe 14 relative to the deck 11. The other of said two pulleys is a winch pulley 22 selectively rotatable under the action of an electric winch motor 99 and having means to lock it against rotation.

In the assembly as illustrated the three pulleys 17,21,22 associated with each tension unit lie in a common vertical plane which is a plane that intersects the associated riser pipe.

A support cable 23 is secured at one end to the winch pulley 22, extends upwards over the intermediate pulley 17, and downwards over the guide pulley 21, the other end being a connection end secured to an annular connection collar 24 fixed to the riser pipe at a position thereof intended always to lie below the guide pulley 21.

The elastomeric bearing assembly 25 interposed between the support tube 16 and housing 18 comprises a stack of eight identical annular elastomeric bearing units 26 (see FIG. 4) arranged to be loaded in series and to deform in shear to facilitate restrained axial movement of the support tube 16 relative to the housing 18.

Figure 4:
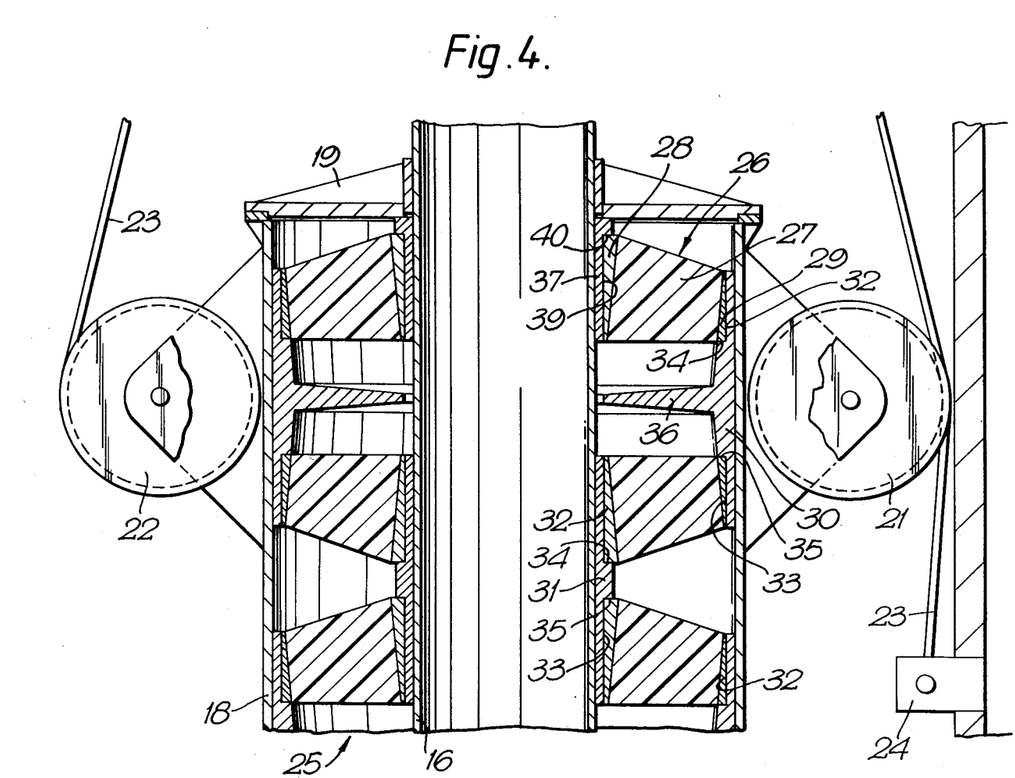
FIG. 4 shows part of FIG. 3 in greater detail.

Each elastomeric bearing unit 26 comprises an annular element 27 of elastomeric material interposed between and bonded to each of a radially inner rigid support ring 28 and a radially outer rigid support ring 29. The confronting surfaces of the support rings and to which an annular elastomeric element is bonded are each of a frusto-conical shape and of substantially similar angle of inclination to the longitudinal direction of the bearing assembly, being the vertical direction as viewed in FIG. 1. The bonded areas at the inner and outer support rings correspond. Optionally one or more sheet metal sleeves of frusto-conical shape may be incorporated in the annular elastomeric element so as to be interleaved between layers of the elastomeric material. One axial end face of the element 27 of elastomeric material is planar and the other frusto-conical when the material is unstressed as shown in FIG. 4, the frusto-conical face being oriented in the bearing assembly such that when compression load is applied to result in shear movement of the elastomeric material said frusto-conical face deforms towards a planar form (see FIG. 1).

The eight bearing units 26 are maintained spaced apart by four outer 30 and three inner 31 guide rings interposed between successive bearing units with the outer guide rings alternating with the inner guide rings. Each guide ring has a pair of cylindrical seating surfaces 32,33 for location of a respective inner or outer rigid support ring 28, 29 and a pair of oppositely facing radial abutments 34,35 to prevent relative axial movement between the guide ring and the support rings supported thereon when axial compression loading is applied to the elastomeric bearing assembly. Each outer guide ring 30 is provided mid-way between its axial ends with a radially inwardly extending failsafe abutment 36 whereby in the event of failure of one elastomeric bearing unit 26 the load acting on the inner support ring 28 of that bearing unit is transferred direct through the outer guide ring 30 to the outer support ring 29 of the next successive bearing unit.

Additional to the aforementioned inner guide rings the bearing assembly comprises upper and lower end inner guide rings 37,38. Each end guide ring has a cylindrical surface 39 and radial abutment 40 for supporting a single inner rigid support ring of an elastomeric bearing unit.

The upper end inner guide ring 37 is secured axially relative to the support tube 16 and the lower end inner guide ring 38 bears against and is supported by the lower end cap 20. The remaining four outer and three inner guide rings are axially slidable respectively relative to the cylindrical housing 18 and the support tube -16. Low friction material may be provided at the sliding interfaces to facilitate ease of sliding movement.

The housing 18 is filled with a viscous fluid such as oil to restrain rapid relative movement of the support tube 16 upwards relative the housing 18 in the event of sudden release of applied compression loading to the elastomeric bearing assembly. Additionally a stop member (not shown) may be secured to the support tube outside of the housing, beneath and spaced from the lower end cap 20 to prevent extreme movement of the support tube upwards relative to the housing.

FIG. 2 shows in plan view a riser pipe 14 as supported by four elastomeric bearing assemblies 15 and makes clear further details of the above-referred inner guide pulley. Each inner guide pulley 21 has at an axial end thereof a cable location groove 41 and adjacent thereto a shallow guide groove 42 to contact and guide the outer surface of the riser pipe. The four bearing assemblies 15 are arranged symmetrically and substantially uniformly spaced around the riser pipe 14 whereby the riser pipe at the region of the guide pulleys is located radially relative to the platform deck 11.

In FIG. 2 for convenience the winch motors and winch pulleys 22 are not shown. The winch pulleys associated with the elastomeric bearing assemblies of a riser pipe (not shown) neighbouring the riser pipe shown in FIG. 1 and 2 are located at a different height above the support deck so as to lie in part above or below one another.

In use of the tension load units 15 to apply the desired tensile load to the riser pipe 14 the winch motors are powered to reduce the free length of the cables 23. In consequence the bearing support tubes 16 are urged downwards (but not as far as) the deformation condition shown in FIG. 1.

Figure 1:
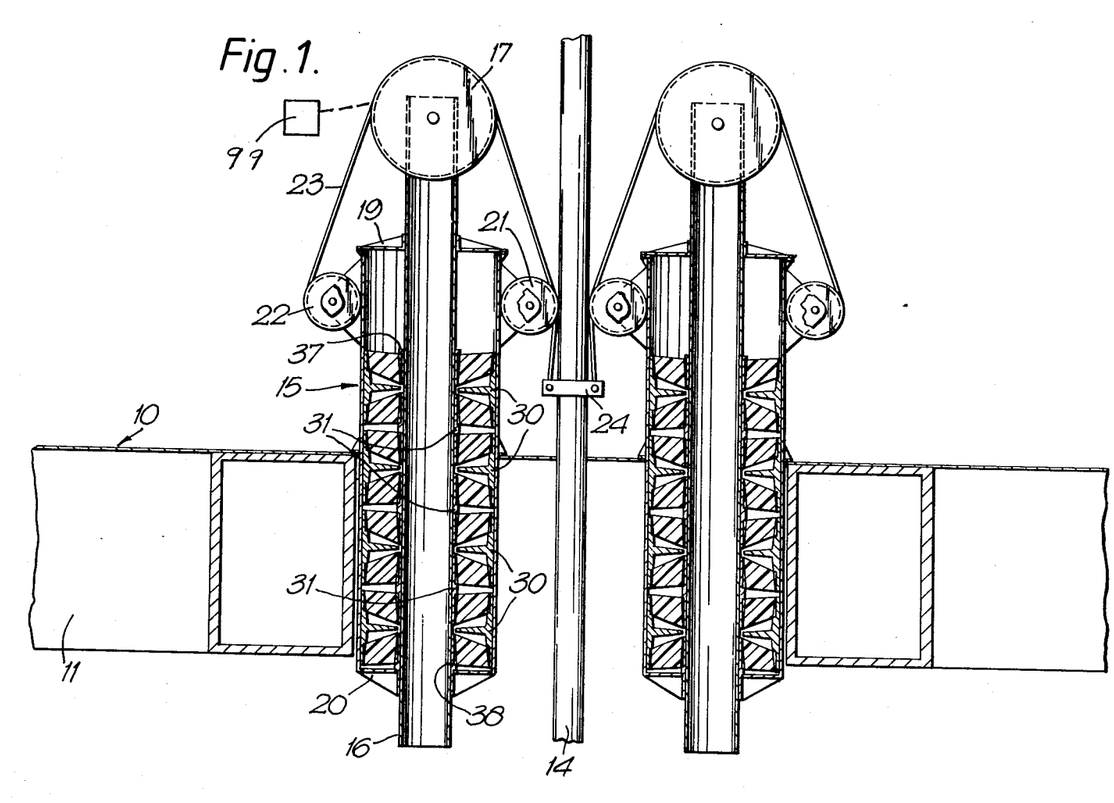
FIG. 1 is a sectional side view of part of an offshore floating platform taken on the line I—I of FIG. 2 and under the action of applied load.
Figure 3:
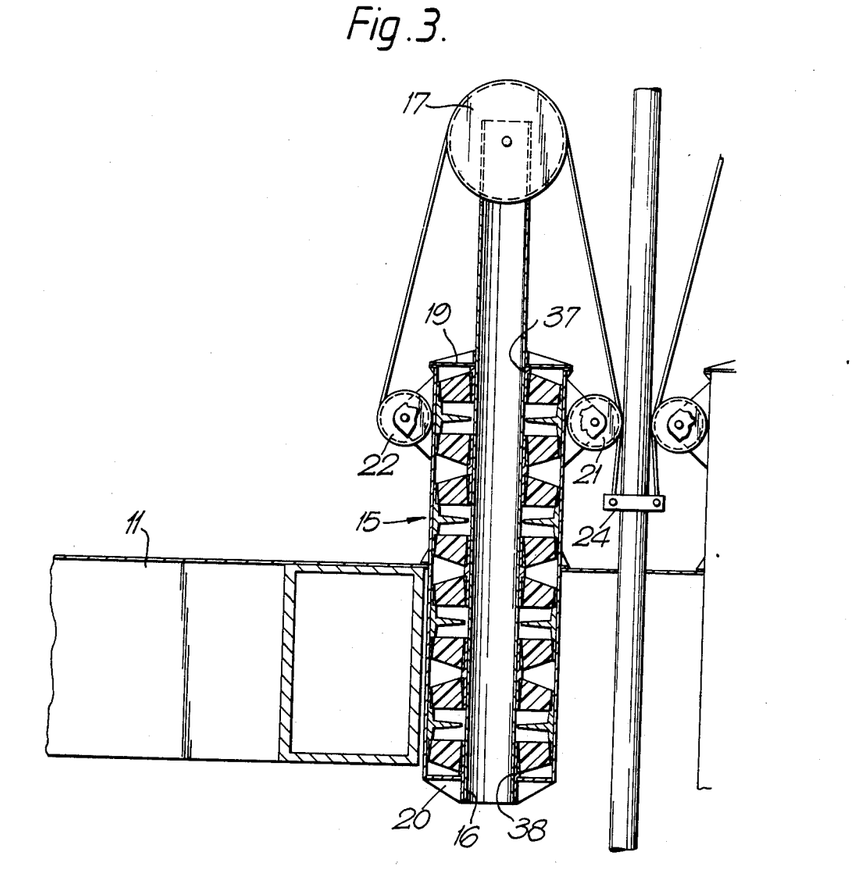
FIG. 3 is a view similar to that of part of FIG. 1 but in the absence of applied load.

Subsequent weather movement of the platform results in either further compression of the elastomeric bearing units to the near maximum deflection condition shown in FIG. 1 or relaxation towards the unloaded condition shown in FIG. 3.

In an alternative embodiment of the invention, illustrated with reference to FIG. 5, the riser pipe tension unit of a platform is constructed substantially as described with reference to FIGS. 1 to 4 except that a pair of auxiliary outer guide sleeves 50,51 are provided between the outer guide rings 52–55 and inner wall of the cylindrical housing 18. An upper of the auxiliary guide sleeves 50 is secured to the uppermost outer guide ring 52 and extends downwards therefrom to surround the next outer guide ring 53. The other 51 of the auxiliary guide sleeves is secured to the lowermost outer guide ring 55 and extends upwards therefrom to surround the next outer guide ring 54. During relative axial movement of the support tube and housing axial movement of the axially inner two (radially) outer guide rings 53,54 is shared between movement of one of the rings and/or surrounding auxiliary guide and between the auxiliary guide and cylindrical housing.

Optionally an auxiliary guide may be provided on one of the inner guide rings to extends axially and surround at least one other inner guide ring thereby also to share relative sliding movement in the axial direction.

Figures 5, 6, 7:
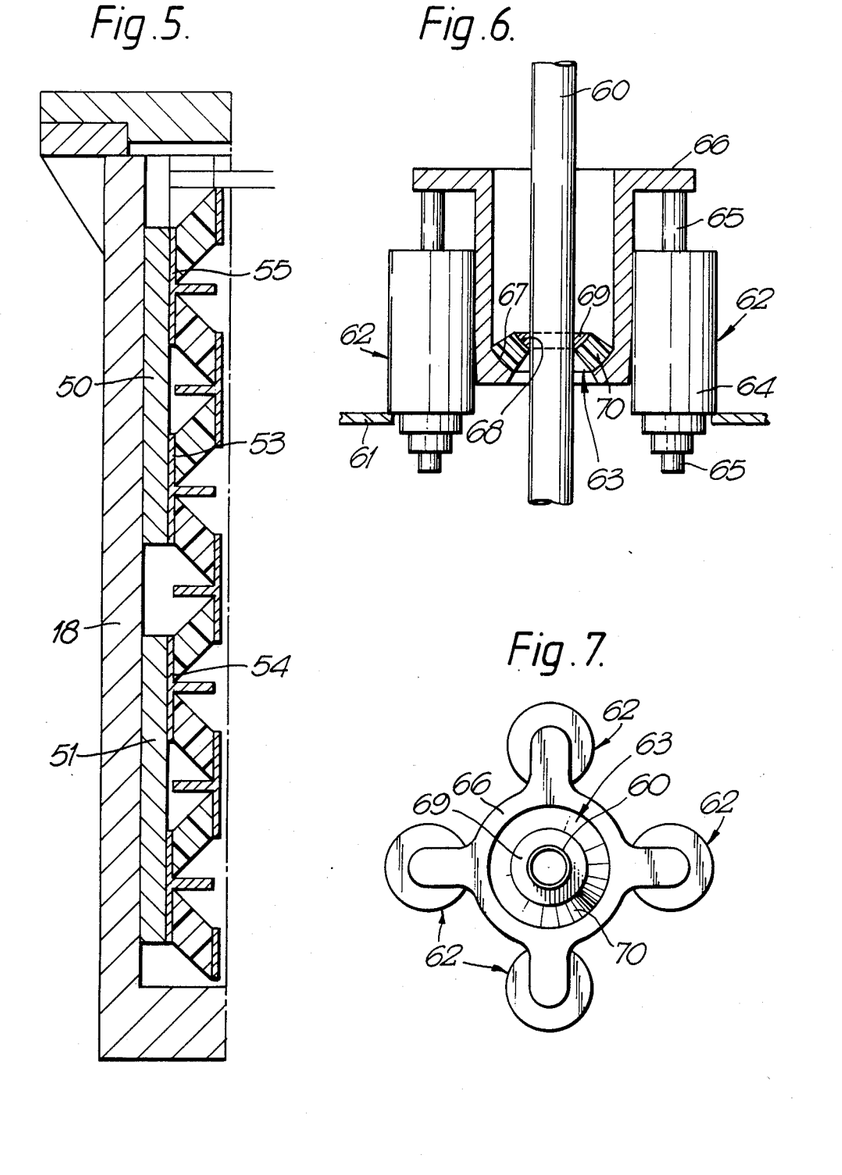
FIG. 5 is a sectional side view of part of a resilient unit in accordance with another embodiment of the present invention.
FIG. 6 is a side view of part of an offshore structure incorporating a resilient unit in accordance with the present invention in a loaded condition.
FIG. 7 is a plan view of FIG. 6.

FIGS. 6 and 7 show part of an offshore structure having an arrangement of four resilient units of the present invention for maintaining tension in a riser pipe.

A riser pipe 60 is located relative to the support deck 61 of an offshore tension leg platform by four resilient elastomeric units 62 and an elastomeric pivot bearing 63.

The four resilient support units are disposed at a uniform spacing from and about the riser pipe 60, the longitudinal axes of the units being parallel with one another and with the direction of the length of the riser pipe.

Each resilient elastomeric unit 62 (described in more detail below) comprises an outer rigid member in the form of a cylindrical housing sleeve 64 for location relative to the support deck and an inner rigid member in the form of a steel support tube 65.

The support tubes 65 of the four units 62 are interconnected by a rigid spider unit 66 which serves also as the outer rigid member of the elastomeric pivot bearing 63.

The spider unit has a concave annular bearing surface 67 of part-spherical shape and which confronts an annular part-spherical convex bearing surface 68 of an inner rigid support ring 69 secured to the riser pipe 60. A layer 70 of elastomeric material is interposed between and bonded to the confronting part-spherical surfaces 67,68. Optionally the elastomeric layer has embedded therein at least one annular part-spherical reinforcing layer of, for example, sheet steel or textile material.

Figure 8:
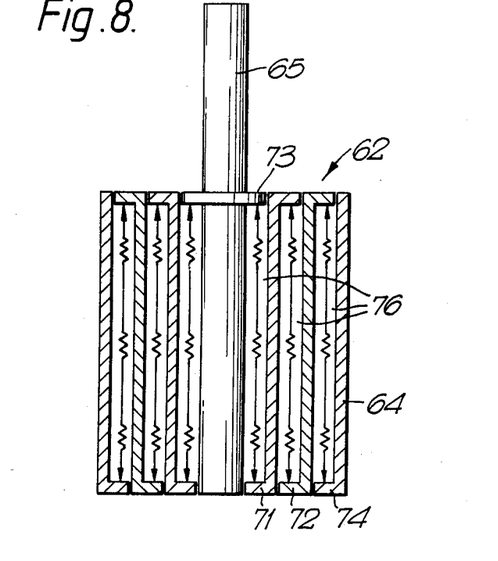
FIG. 8 is a sectional side view of a resilient unit of FIG. 6 showing the unit in an un-loaded condition.

Each resilient elastomeric unit 62 acts as a load cell and comprises two generally cylindrically shaped intermediate rigid members 71,72 interposed between the housing sleeve 64 and the support tube 65. Each intermediate sleeve member has a radially outwardly extending flange at one axial end and an inwardly extending flange at the other axial end. The intermediate members are interconnected in series with one another, the housing 64 and support tube 65 by three concentrically arranged elastomeric bearing assemblies 76.

Each elastomeric bearing assembly 76 is constructed as described above with reference to FIGS. 1 and 4, it thus comprising elastomeric bearing units interposed with rigid support rings and arranged to be loaded in series in a manner which results in shear deformation of the elastomeric material.

An innermost bearing assembly 76 acts between a flange 73 on the tube 65 and an inwardly directed flange of the inner intermediate member 71. A middle bearing assembly acts axially between the outer flange of the inner intermediate member 71 and inner flange of the outer intermediate member 72. The third, outer bearing assembly acts between the outer flange of the outer intermediate member and an inner end flange 74 of the housing 64.

Figure 9:
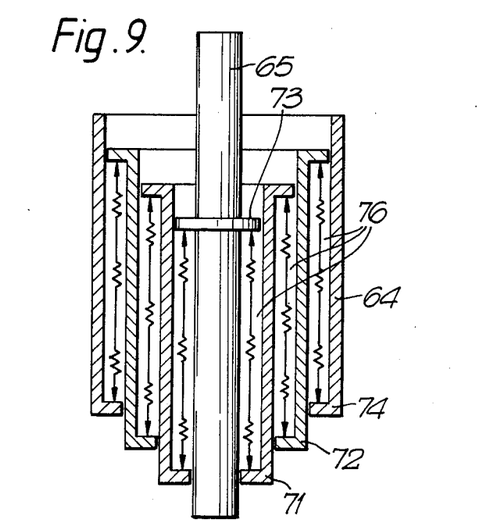
FIG. 9 shows the unit of FIG. 8 subject to load.

When the riser pipe 60 is loaded in tension each resilient load unit 62 deforms to a configuration such as that shown by FIG. 9. Movement of the riser pipe from the vertical direction, or relative movement of the support deck 61 from the horizontal is accommodated primarily by shear deformation of the elastomeric pivot bearing 63.

In another embodiment of the invention (described with reference to FIG. 10) a riser pipe 60 is secured relative to the support deck of a tension leg platform by a single resilient unit 80.

Figure 10:
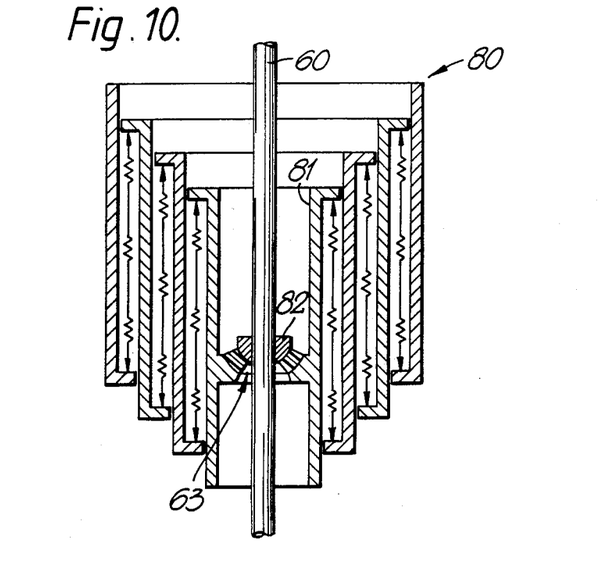
FIGS. 10 and 11 show sectional side views of parts of other offshore structures in accordance with the present invention.

The resilient unit 80 is constructed substantially similar to the above-described resilient unit 62 except that the support tube 65 is replaced by an inner housing 81. The inner housing is formed integrally, mid-way between its ends, with a ring 82 which provides an annular part-spherical convex bearing surface for the elastomeric pivot bearing 83. FIG. 10 shows the resilient unit under axial load.

Figure 11:
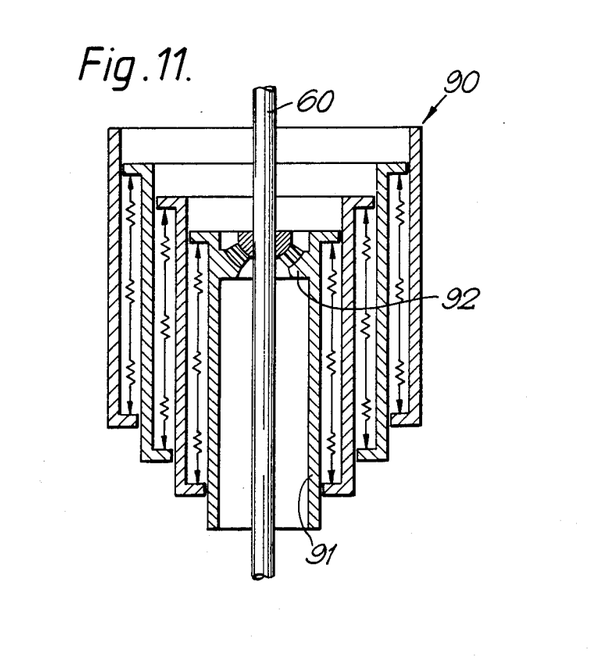

In a further embodiment of the invention (described with reference to FIG. 11) a riser pipe is resiliently secured relative to a tension leg platform by a resilient unit 90 substantially similar to the above-described unit 80. The unit 90 differs in that the inner housing 91 is formed with the integral bearing ring 92 at an upper end of the inner housing 91 in contrast to the mid-way position of FIG. 9.

What I claim is:

1. A resilient unit comprising an inner rigid member, an outer rigid member, and an elastomeric bearing assembly interposed between said rigid members whereby said rigid members are able to move axially relative to one another in a restrained manner, said elastomeric bearing assembly comprising an axially extending arrangement of a series of annular elastomeric elements which each alternate with and are bonded to respective support means of a series of rigid support means with a plurality of elastomeric bearing units arranged to be loaded in series and to deform in shear thereby to provide said restrained relative axial movement of the rigid members in response to applied axial load said series of rigid support means comprising a series of outer rings alternating with inner rings, the outer being bonded to radially outward portions of the elastomeric elements and the inner rings being bonded to inner portions of said elements.

2. A resilient unit according to claim 1 wherein the bearing assembly is of a cylindrical shape and the bonded interfaces are all of generally cylindrical shape whereby axial load applied to the resilient unit results in respective elastomeric elements being loaded primarily in shear in series with one another.

3. A resilient unit according to claim 1 and comprising between the inner and outer rigid members a plurality of said elastomeric bearing assemblies arranged in a nested configuration.

4. A resilient unit according to claim 3 wherein a pair of ends of successive bearing assemblies are interconnected whereby load is transmitted from one assembly to the other to load each assembly in series as one of the inner and outer rigid members is moved relative to the other.

5. A resilient unit according to claim 4 wherein the interconnected ends of succesive bearing assemblies are opposite ends.

6. A resilient loading mechanism comprising a resilient unit according to claim 1 and associated therewith a connecting means and a mechanical advantage means which transmits to the connecting means a movement which is greater than and in response to relative axial movement of the inner and outer rigid members.

7. A resilient loading mechanism according to claim 6 wherein the mechanical advantage means is a pulley system comprising a line member and at least one wheel rotatably secured relative to one of the inner and outer rigid members of the resilient unit.

8. A resilient loading mechanism according to claim 6 wherein the connecting means is comprised by an end region of a cable-like line member.

9. A resilient loading mechanism according to claim 7 wherein said pulley mechanism comprises a pulley wheel which serves to guide the pulley line member and also provide location of an attachment secured to the connecting means in a direction substantially transverse relative to the direction of movement of said attachment under the action of the connecting means.

10. A resilient loading mechanism according to claim 7 wherein means is provided to vary the free length of the pulley line member between the connecting means and an end of the pulley line member secured relative to one of said inner and outer rigid members.

11. A resilient loading mechanism comprising a resilient unit according to claim 1 and an elastomeric pivot bearing arranged in series with said resilient unit, said elastomeric pivot bearing comprising a layer of elastomeric material of part-spherical or substantially part-spherical shape located between complementary shaped rigid bearing surfaces.

12. A resilient loading mechanism according to claim 11 wherein said elastomeric material is bonded to said bearing surfaces.

13. A resilient loading mechanism according to claim 11 wherein the elastomeric pivot bearing is of an annular form to permit fluid flow therethrough.

14. A resilient loading mechanism according to claim 11 wherein the pivot bearing is positioned co-axially relative to the resilient unit.

15. A resilient loading mechanism according to claim 11 and comprising a plurality of resilient units wherein said pivot bearing is secured to or integral with a rigid member of each of said resilient units.

16. A resilient loading mechanism according to claim 15 wherein said resilient units are uniformly disposed about a central axis coincident with the longitudinal axis of the elastomeric pivot bearing.

17. An offshore structure wherein an attachment is maintained under tension by means of a resilient loading mechanism according to claim 6.

18. An offshore structure wherein an attachment is maintained under tension by means of a resilient loading mechanism according to claim 11.

* * * * *